(12) United States Patent
Cantini et al.

(10) Patent No.: US 7,610,040 B2
(45) Date of Patent: Oct. 27, 2009

(54) METHOD AND SYSTEM FOR DETECTING POSSIBLE FRAUDS IN PAYMENT TRANSACTIONS

(75) Inventors: Renato Cantini, Belfaux (CH); Karin Busch Lauper, Bern (CH)

(73) Assignee: Swisscom Mobile AG, Bern (CH)

( * ) Notice: Subject to any disclaimer, the term of this patent is extended or adjusted under 35 U.S.C. 154(b) by 166 days.

(21) Appl. No.: 11/209,138

(22) Filed: Aug. 22, 2005

(65) Prior Publication Data

US 2005/0278192 A1    Dec. 15, 2005

Related U.S. Application Data

(63) Continuation of application No. PCT/EP2004/050180, filed on Feb. 20, 2004.

(30) Foreign Application Priority Data

Feb. 21, 2003    (EP) .................................. 03100433

(51) Int. Cl.
*H04M 1/66*    (2006.01)
*H04M 1/68*    (2006.01)
*H04M 3/16*    (2006.01)

(52) U.S. Cl. ........................ 455/410; 455/406; 455/407; 455/408; 455/411; 705/38; 705/39; 379/189; 340/5.9

(58) Field of Classification Search ................. 455/406, 455/407, 408, 410, 411; 705/38, 39; 379/189; 340/5.9
See application file for complete search history.

(56) References Cited

U.S. PATENT DOCUMENTS

| | | | |
|---|---|---|---|
| 5,475,377 A * | 12/1995 | Lee | ............................. 340/5.9 |
| 5,615,408 A | 3/1997 | Johnson et al. | |
| 5,627,886 A | 5/1997 | Bowman | |
| 5,790,645 A * | 8/1998 | Fawcett et al. | ............... 379/189 |
| 6,088,686 A * | 7/2000 | Walker et al. | .................. 705/38 |
| 6,097,938 A | 8/2000 | Paxson | |
| 6,370,373 B1 * | 4/2002 | Gerth et al. | .................. 455/410 |
| 6,796,490 B1 * | 9/2004 | Drummond et al. | ......... 235/379 |
| 7,356,506 B2 * | 4/2008 | Watson et al. | .................. 705/39 |
| 2002/0130176 A1 | 9/2002 | Suzuki | |
| 2002/0133721 A1 | 9/2002 | Adjaoute | |
| 2002/0147754 A1 | 10/2002 | Dempsey et al. | |

FOREIGN PATENT DOCUMENTS

| | | | |
|---|---|---|---|
| GB | 2 237 670 A | | 5/1991 |
| GB | 223767 | * | 5/1991 |
| GB | 2372361 | * | 8/2002 |
| WO | WO 98/47116 | | 10/1998 |
| WO | WO9847116 | * | 10/1998 |
| WO | WO 99/56495 | | 11/1999 |

* cited by examiner

*Primary Examiner*—Stephen M D'Agosta
(74) *Attorney, Agent, or Firm*—Pearne & Gordon LLP (57) ABSTRACT

Method for detecting possible frauds in payment transactions between at least two partners (1, 2),
the payment transaction data and/or payment authorization data being transmitted over at least one mobile radio network,
at least one multivalued parameter used for detecting a possible fraud attempt being determined in said mobile radio network,
said payment transactions being performed over at least one payment service provider (4),
at least a second multivalued parameter used for detecting a possible fraud attempt being determined by said payment service provider (4),
and certain combinations of said first and second parameters are sought in said fraud detection module in order to detect fraud attempts.

12 Claims, 2 Drawing Sheets

METHOD AND SYSTEM FOR DETECTING POSSIBLE FRAUDS IN PAYMENT TRANSACTIONS

REFERENCE DATA

This application is a continuation of International Patent Application PCT/EP2004/050180 (WO04075130) filed on Feb. 20, 2004, claiming priority of European patent application EP03100433.6 of Feb. 21, 2003, the contents whereof are hereby incorporated.

FIELD OF THE INVENTION

The present invention concerns a payment module, in particular an electronic payment card, as well as a payment system and a payment method for effecting payments with this card.

DESCRIPTION OF RELATED ART

According to the state of the art so far, payment transactions between a customer (user, for example a mobile user) and a provider (for example a trader) are often effected with an electronic payment card. Debit and credit cards are used for example at tills in shops, at petrol stations etc. The card usually comprises memory means (for example a magnetic strip and/or a chip) in which among others the customer's identification is stored. To perform a transaction (for example in order to pay for an article in a shop), the user must insert his card at the trader's in a suitable card reader. The terminal then reads the money account identification (for example the PAN, Primary Account Number) in the card, determines and shows the amount to be paid, if necessary checks the user's solvency and requests that the user confirms the transaction with a confirmation key on the trader's terminal. If the client is solvent and has entered his confirmation, the money account owner identification, the amount to be paid and possibly also a terminal identification are transmitted to a finance server connected with the terminal over a telecommunication network. Accordingly, the user's account at this payment service provider server is debited immediately or later.

Providers more and more often have "virtual terminals" (for example software components) that work together with a money card for payment transactions. In the following description, we will speak of a provider payment module, while this module can be either a physical terminal or a software application.

A difference for card-based payment systems is made between value cards (or electronic money), credit cards and debit cards. In the case of value cards, the payment card usually has a memory area in which (in general previously) a money amount has been loaded (prepaid). The money amount can often also be stored for security reasons in a remote server; in this case, the value card can include merely one identification of the corresponding account in this server. In the case of credit cards, the card is linked to an account of the user with a finance institute, this account being debited only after the transaction (pay later). In the case of debit cards, on the other hand, the linked account with the finance institute must be loaded in advance and is debited during or immediately after the transaction (pay now).

A disadvantage of those methods is the necessity of inserting the user's card into a foreign apparatus. The users normally do not have their card at hand but for example in their wallet; a very fast transaction is therefore not possible.

These cards contain a money account owner identification that only allows the user to be identified with the payment service provider. A card can thus normally be used for a financial transaction only if the user and the provider are affiliated with the same payment service provider. On the other hand, the card is not intended to be used for other kinds of transactions (for example for non-financial transactions). It is thus unavoidable for the user to always own a great number of cards for each kind of financial or non-financial transaction, for example several value cards, debit cards or credit cards that are administered by different finance institutes or chain stores, or subscription cards or access cards for secured areas. These cards are usually protected by different PIN codes which the user must make an effort to memorize. Furthermore, both the users as well as the traders must administer different accounts, which involves for each account studying the general business terms, loading prepaid and value accounts in advance, checking account statements, etc.

In order to avoid these problems, it has been proposed among others in patent application WO98/37524 to use the SIM (Subscriber Identity Module) card for identifying the user in a mobile radio system as an electronic payment card. A contactless connection (for example an infrared connection) between the user mobile device and the provider terminal is established for transmission of the transaction data. The user can thus forgo having to pull out an electronic card from his wallet and inserting it into a foreign apparatus.

From the prior art so far, payment methods are also known wherein the transaction data are transmitted between the user mobile device and a trader terminal not directly but over a payment platform in the mobile radio network. In this case, receipts or a reference for the transaction are transmitted, often over SMS (Short-Message Service) or USSD (Unstructured Supplementary Service Data). These solutions have the advantage that no tedious and security-critical direct connection need be established between the mobile device and the terminal. Furthermore, they also allow transactions between users and providers that are not located in close proximity to one another.

Payment methods in which a single payment card is bound to several money accounts are also known from the prior art so far. In this way, the user can forgo the necessity of having several payment cards with him.

If such a card bound to several accounts is used with a terminal often also bound to several accounts), the user must determine which money account is to be used for the transaction. If a card is bound for example to a prepaid value account and to several credit and/or debit card accounts, the user can usually decide in a menu in the trader terminal which money account is to be debited. Different parameters can be taken into account, for example the credit standing of each account, the transaction costs, the security, the comfort, etc.

Providers barely have the possibility of influencing the user's choice between the available money accounts.

The acceptance of a new payment service by user and provider and thus the economical operation of the service depend on strict security criteria. In particular, frauds or probable fraud attempts must be detected reliably and at an early stage. If possible fraud attempts are detected before the payment transaction, the transaction must be timely declared invalid and blocked. If frauds are detected only after the transaction, the concerned user card respectively the provider can at least be blocked for further transactions; other legal measures and measures by the police can also be taken. It is however necessary to ensure that fraud detection systems do not react too restrictively and block valid transactions or cards.

In order to detect possible frauds, payment service providers follow a plurality of parameters with which behavior patterns that are typical for fraud should be detected. Unexpected changes of the payment behavior, for example if the payment amounts and/or the frequency of the payment transactions suddenly increase, can for example be considered together with other parameters as a clue for a possible fraud (for example a stolen or misused card). Well-honed algorithms and data mining tools are often used to detect user or provider behavior typical for fraud.

WO9847116 describes a method for accepting or blocking transactions with a mobile device. In a first step, the locations of the seller and of the buyer in the mobile radio network are determined and forwarded to a server. If these two partners are not located close to one another, the transaction is broken off. It is only when the buyer and the seller are close to one another that a transaction query is sent in a second step to the server of an external payment service provider. The payment service provider then tries on the basis of other parameters to detect possible fraud attempts. The transaction is only performed when no fraud or fraud attempt is detected.

This method thus uses the mobile user location determined in the mobile radio network to accept or block a transaction. Possible frauds can thus be detected already in the mobile radio network.

In this method, the server in the mobile radio network and the server of the finance institute thus make successive, independent, binary decisions: blocking or accepting. It is only if both decisions are positive that the transaction is accepted.

In certain situations, neither the transaction service provider nor the mobile radio network can make an unequivocal decision alone. In particular, the indications available in the mobile radio network about the location of the buyer and of the seller are usually not sufficient to block the transaction. In many applications, a buyer that is far away from the seller, though surprising, does not constitute in itself a sufficient reason to block the transaction.

It is an aim of the present invention to propose a method and a system that allow frauds and fraud attempts to be detected reliably.

It is another aim to propose a method and a system that allow additional services and useful functions.

BRIEF SUMMARY OF THE INVENTION

According to the present invention, these aims are achieved in particular through the elements of the characterizing part of the independent claims. Further advantageous embodiments can furthermore be derived from the dependent claims and the description.

In particular, these aims are achieved through a method for detecting possible frauds in payment transactions between two partners (for example between a mobile user and a provider), wherein at least one multivalued parameter used for detecting a possible fraud attempt is determined in said mobile radio network, wherein said payment transactions are performed over at least one payment service provider (4), wherein at least one second multivalued parameter used for detecting a possible fraud attempt is determined by said payment service provider, wherein certain combinations of said first and second parameters are sought in said fraud detection module in order to detect fraud attempts.

This has the advantage that several multivalued parameters of the mobile radio network and of a payment service provider are combined before a decision is made. This also allows new fraud clues to be used.

A "multivalued parameter" in this context means a parameter that can contain more than two binary values. Thus not only trivial parameters such as "accept"/"not accept" can be combined but also more complex variables or sets of variables.

At least certain first and/or second multivalued parameters are preferably transmitted over a communication network in order to be available in a common fraud detection module (in which certain parameter combinations are looked for). The fraud detection module comprises for example a server and/or a software application.

According to the invention, parameters of the mobile radio network and of the payment service provider are not treated independently from one another but combined in order to look for certain combinations that could indicate a fraud attempt.

The decision that a fraud or fraud attempt is probable is thus based on more complex processes than pure sequences of binary independent tests. It is possible for example to use more complex combinations of parameters of the mobile radio network and of the payment service providers as clues for a possible fraud attempt.

The payment platform is preferably located in the infrastructure of the mobile radio network or can access network-internal parameter of the mobile radio network. These parameters comprise for example the mobile user's location determined within the mobile radio network, the time determined within the mobile radio network, the trajectory of the mobile radio network, the used SIM card, the used mobile device etc. According to the invention, these parameters of the mobile radio network are used simultaneously with parameters of the payment service provider in order to detect possible frauds. The parameters of the payment service provider comprise among others the used payment service, the used money account, the balance on the used money account, the payment amount etc. This has the advantage that frauds can be detected faster and more reliably by using additional parameters and new parameter combinations, and that new algorithms can be used with which other suspect user and/or provider behaviors can be detected.

In a preferred embodiment, at least certain money accounts are administered from the platform in the infrastructure of the mobile radio network. Transaction data for transactions with several money accounts, that can possibly be offered by several payment service providers and/or several finance institutes, are thus transmitted through a common platform and assessed in this payment platform. This has the advantage that a possible fraud can be detected with a greater certainty since it is possible to monitor the user's behavior with several independent money accounts and since this behavior can be correlated with parameters that are available only in the infrastructure of the mobile radio network. This platform further has the advantage that consolidated invoices and statements of account comprising transaction data with several money accounts can be used for the user and/or for statistical purposes.

In a preferred embodiment, sums of money can be transferred between different money accounts of a user or even between different users, preferably over the common platform. In particular if a provider is simultaneously a mobile user, peer-to-peer money transactions can thus be performed over the payment platform administered by the network operator. This allows for example a prepaid account for which the debit limit has been exceeded to be loaded upon request or even automatically (if predefined criteria have been met) from another money account of the same or of another user. This also allows money amounts to be transferred from person to person. It is thus also possible to define debit or credit limits for closed groups of users.

Proactive loading means can also be provided for automatically loading value and debit accounts when certain criteria have been met, for example if the balance of an account has reached a bottom threshold.

The different money accounts of a user can be administered by different payment service providers. Each payment service provider can determine their own business terms for the user of their service. The inventive system and method preferably has means for transmitting the business terms to the user to ensure that the user reads these business terms, as well as means for sending a confirmation that these business terms have been accepted.

The availability respectively blocking of a certain money account bound to an identification card can be decided according to internal parameters of the mobile radio network. It is thus possible within the frame of the invention to block a certain money account if the user is located outside a predefined geographical area and/or during predefined time periods.

BRIEF DESCRIPTION OF THE DRAWINGS

The present invention will be better understood with the aid of the description given by way of example and illustrated with the attached figures in which.

DETAILED DESCRIPTION OF POSSIBLE EMBODIMENTS OF THE INVENTION

Figure 1:
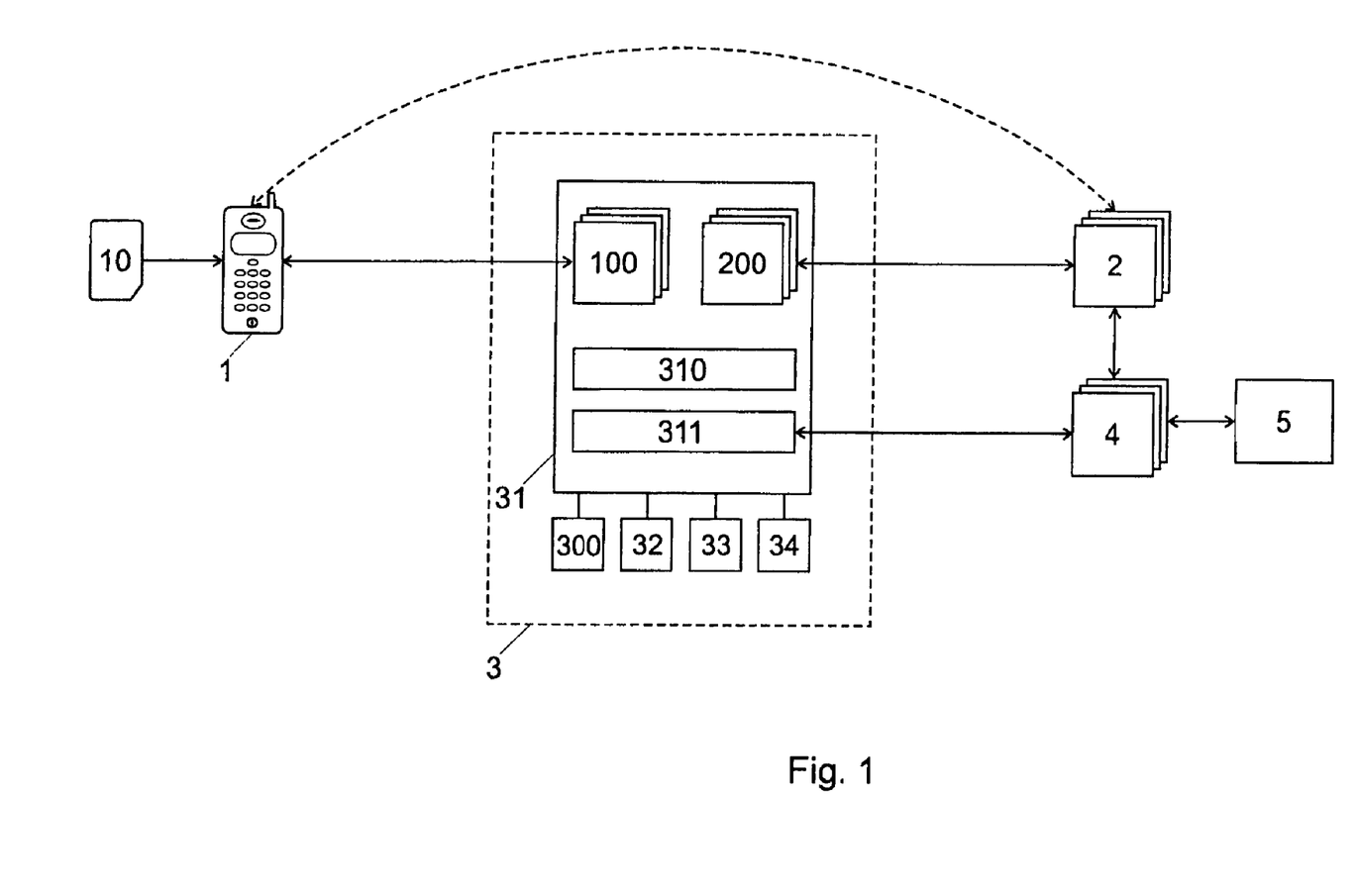
FIG. 1 shows a block diagram illustrating the flow of information in a preferred embodiment of the system of the invention.

FIG. 1 shows a block diagram with the main actors or components of the system. In the represented example, the system includes a plurality of users (mobile users) that each has a mobile device. "Mobile device" in this context means both portable devices as well as apparatus connected to a fixed network but that are identified by an identification module rather than by the point of connection to the network.

In the following description and in the claims, the reference sign 1 refers to either the user (account owner) or to the mobile device 1, except when a distinction is explicitly made. The mobile devices include an identification module 10 for identifying the user in a mobile radio network. The identification module 10 is preferably personal, portable and can be separated from the mobile device; it is preferably a chipcard. The mobile device 1 can for example be a digital cellular mobile telephone (for example a GSM, HSCSD, GPRS, EDGE, CDMA) or a UMTS mobile telephone, or a computer (for example a PDA) or a laptop with a contactless interface (for example with a GSM, HSCSD, GPRS, EDGE, CDMA, UMTS or WLAN extension card). As a variant embodiment, the mobile device 1 could also be an ad-hoc device that can set up connections in an ad-hoc network. The identification module 10 is for example a SIM card.

The user mobile device 1 can be connected to the infrastructure 3 of a mobile radio network in order to set up voice and data connections with other devices. Infrastructure in this description and in the claims means that part of a network that is administered and operated by the operator of the network, including fixed stations, switches, home data registers, billing centers, servers for additional services etc. The infrastructure 3 of the inventive system includes a payment platform 31 that will be described in more detail further below, additional modules 300, 32, 33, 34 as well as conventional components that will not be described here.

A plurality of providers 2 that offer products, information or services to the users 1 against payment is also connected to this infrastructure. As will be explained further below, users 1 can sometimes also be providers, whilst providers 2 can also order and pay for products or services from other providers or users, so that the formal distinction between users and providers is rather theoretical. Providers can for example be traders (including online traders, traders in retail trade, ticket sellers, telecom added value service providers and/or payment machines).

Providers have provider payment modules, for example POS (Point-of-Sale) terminals or payment applications. Hereafter in the description and in the claims, the reference sign 2 will refer either to the providers or to their provider terminals, except when a distinction is explicitly made.

The users 1 and the providers 2 each have one or several money accounts with one or several finance institutes 5 that can be accessed through a plurality of payment service providers 4. Payment service providers are for example credit card companies, debit card companies, banks, postal services and other finance institutes that issue payment cards, including the mobile radio network operator. Finance institutes are for example banks, postal services and other organizations that administer third party money accounts. Each payment service provider 4 offers one or several payment services that can be subscribed to by users and providers. Each user and provider has a money account with the finance institute for each subscribed payment service. In the case of a credit or debit card service, the money account will typically be stored with the finance institute; for value cards, on the other hand, the money amount is on a money account in a user chipcard.

At the beginning during a payment transaction operation payment transaction data and/or payment authorization data are typically exchanged between a user and a provider. After a certain point in time (for example after an order has been confirmed by the provider), the user is forwarded to the payment service provider. Payment transaction data are then transmitted between the user and the provider. This method described among others in WO02/05231 ensures the confidentiality of the payment data vis-à-vis the providers and their anonymity vis-à-vis the payment service providers.

Mobile radio network prepaid and postpaid money accounts should be mentioned as a special case of money accounts that are bound to a card 10. These money accounts are used mainly for paying the services of the mobile radio network operator, among others for paying the voice and data connections over the network, for buying additional services, including downloading ring tunes, images, etc.

Payment service providers use the server 4 to identify respectively authenticate users for a transaction and to allow or block money transactions. Payment service providers can further establish blacklists of bad payers and unwanted users. Clearing operations, sending of bills and account statements, loading of prepaid accounts and other such operations are also performed by individual payment service providers 4 (for example by means of associated finance servers 5).

According to the payment methods to date, each user receives a physical card to prove his subscription to a payment service before a money transaction. Each money account is then bound to another card. If a user wishes to subscribe several debit, credit and/or value cards for his different payment purposes, he has to carry several payment cards and select the correct one for each payment transaction, which can prove impractical and problematic for security reasons.

According to the invention, several money accounts that can correspond to several payment services of several payment service providers 4 are bound to a common identification module 10. In a preferred embodiment, the SIM card 10, designed for identifying the user 1 in a mobile radio network, serves as multifunctional payment card bound to several money accounts. The subscription to several payment services is thus proved with the ownership of a single chipcard.

Conversely, a single money account can be bound to several identification modules. This allows for example for each member of a family or a company to have his own identification module to access a common money account.

The identification module 10 includes a memory of those areas that are made available by the mobile radio operator to the payment service providers for storing the required data. Each payment service provider thus uses a predefined memory area of the SIM card of the subscribing users in which data (for example card number, money amounts, spending limits, transaction log files, temporary or permanent service-dependent data and programs etc.) can be stored. In another preferred embodiment of the invention, these data (or part of these data) are stored in a payment platform 31 in the infrastructure of the mobile radio network. The different money accounts to which an identification card 10 is bound are thus consolidated in a virtual wallet 100 in the platform 3. A logical link between a physical card 10 and the corresponding wallet 100 of money accounts of subscribed payment services can for example occur over the IMSI (International Mobile Subscriber Identity) card number, the MSISDN (Mobile Subscriber ISDN Number) and/or the ICCID (Integrated Circuit Chip Identification).

In a similar fashion, all the services and money accounts of a provider 2 can be consolidated in a wallet 200 in the payment platform 3, a logical link between a provider 2 and the corresponding wallet 200 being possible over a provider identification.

The inventive system further includes an automatic money account determining module in order to automatically determine the ideal pair of money accounts that is used by the mobile user identification module and by the provider payment terminal for a payment transaction. A proactive loading module 311 is used for subsequently loading the different money accounts (manually or automatically initiated by different parameters).

The infrastructure of the mobile radio network 3 further preferably includes a location-determining module 300 in order to determine the location of the user 1. This location can be the cell of the mobile radio network in which the user is currently located or is preferably determined with a better accuracy on the basis of triangulation methods from signals from several antennas and/or with satellite location-determining means. The determined location can be used to block or allow money accounts in certain areas.

A cryptoserver 32 is available in the infrastructure 3 to encrypt respectively decrypt messages with the users 1, with the providers 2 and/or with the payment service providers 4. The cryptoserver 32 can also be used to verify and if necessary confirm the authenticity, the integrity and the origin of the message.

The reference 33 illustrates the inventive fraud detection module described further below. This module combines parameters that are known within the mobile radio network (for example user location and provider location) with transaction specific parameters (for example the identity of the transaction partners or the transaction amount) in order to detect suspect transactions or cards 10. In a variant embodiment, not represented, this module is operated by the payment service providers (instead of by the mobile radio network operator).

The element 34 is a database in which the business terms of the different payment service providers are stored. Means are provided to ensure that these conditions are accepted by the users before a money account is cleared.

Figure 2:
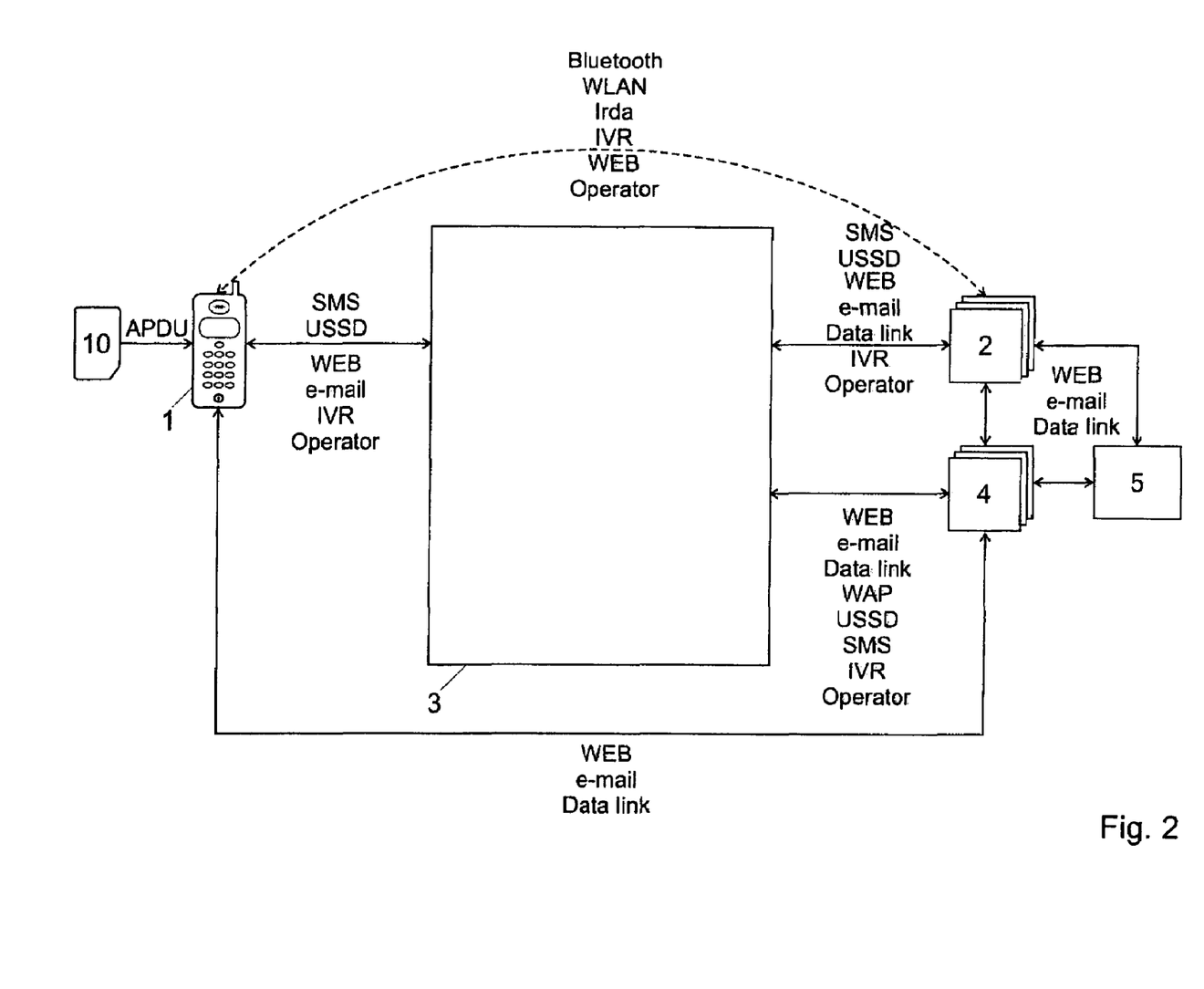
FIG. 2 shows a block diagram illustrating by way of example possible data channels between the different actors of the system.

FIG. 2 shows the possible data channels that can be used for a payment transaction between the different actors of the system.

The identification module 10 is typically accommodated as an ISO chipcard in the mobile device 1 and communicates through APDU commands with this mobile device. The mobile device is for example a GSM mobile device and can thus exchange SMS (Short Message System) or USSD (Unstructured Supplementary Service Data) or messages over routed data packets with the platform 3. As a variant embodiment, data can also be transmitted over Internet (for example with a WEB or WAP browser or per e-mail) between the mobile device 1 and the platform 3. In a variant embodiment, the platform 3 has an IVR (Interactive Voice Response) interface with which voice commands can also be transmitted over the voice channel. In another variant embodiment, data can also be communicated over a human operator (for example in a Call Center). In yet another variant embodiment, data are sent to the platform 3 over a contactless interface, for example a WLAN or Bluetooth interface.

In a similar manner, the providers 2 can also exchange data with the platform 3 over SMS, USSD, e-mail, WEB, WAP, over IVR and/or over a human operator. Other data connections (for example over routed data packets or over another data channel) can also be provided within the frame of the invention.

Depending on the payment procedure, a direct connection between the user 1 and the provider 2 can be established, for example over Bluetooth, WLAND, WEB (for example over a transaction reference), IVR, over a human operator or over an infrared interface, or by connecting the SIM card or the whole mobile station galvanically with a terminal of the provider. In this manner, at least part of the payment data can be directly transmitted fast and at no cost.

The payment service providers 4 do not need to be mobile and are thus preferably connected with the platform 3, with the users 1, (if necessary) with the providers 2 and possibly with the finance servers 5 over a fixed data link (for example over WEB, e-mail, routed data packets or over another data link). The connection between the payment platform 31 and the payment service providers 4 is preferably secured (for example over a virtual private network). Payment data between the payment platform 31 and the payment service providers can also be sent in data that concern several payment transactions. Connections with the users 1 and with the providers 2 can also be provided by facsimile or post.

As already mentioned, both the users 1 and the providers 2 can subscribe to several payment services of several payment service providers. Accordingly, identification modules 10 and terminals of the providers can be bound to several money accounts 100 respectively 200. If a user 1 wishes to perform a payment transaction with a provider 2, it is necessary to first decide with which payment service the transaction is to be performed. It is for example necessary to decide whether the transaction should be performed with a credit card, debit card or value card payment service and with which provider of this kind of services.

This decision is preferably made automatically by the determining module 310. In the represented preferred embodiment, this module is located in the payment platform 31 and is thus administered by the operator of the mobile radio network. This has the advantage that this operator can remain neutral vis-à-vis the different payment service providers and that no provider is given priority. Furthermore, the module 310 can use parameters that are determined and known within the infrastructure of the network.

The determining module preferably consists of a software and/or hardware module, for example of a software application that is executed by a server in the infrastructure 3 of the mobile radio network. The server can communicate over different data channels with the mobile devices 1, with the terminals of the provider 2 and with the payment service providers 4.

The decision to use a certain money account for a certain payment transaction can depend for example on the following parameters: transaction amount, bonus points, predetermined mobile user preferences, security factors, anonymity, user's location, identity of the mobile radio network into which the mobile user is logged, exchange rate with the different money accounts, fees for using the different money accounts, interest rates, available balance, periodical credit or debit limits, time, date and/or day of the week, log file of previous transactions, used mobile device or mobile device type, white respectively black list of providers and/or mobile users, etc.

Other parameters and priorities can be provided by the providers 2 and/or by the payment service providers.

For reasons of data protection, payment transaction data respectively payment authorization data are preferably transmitted transparently over the mobile radio network; the operator of the payment platform 3 in this case has no possibility to access the payment data of the different users or providers. In a variant embodiment, at least certain payment transaction data or payment authorization data that are destined for at least certain payment service providers are preferably made available to the payment platform with the users' or providers' consent. This has the advantage that the payment platform, with the payment data of different users, can offer providers and payment service providers additional value-added services, including:

Sending consolidated bills to users and consolidated credit notes to providers, in which transactions that have been performed over several payment service providers are consolidated.

Determining consolidated credit and/or debit limits to determine a maximum spending amount per time unit over several money accounts. This gives the user, the provider and the payment service provider a higher security since the entire spending amount with all money accounts of an identification module are limited.

Fraud detection through monitoring of the user's behavior with several money accounts. This characteristic will be described in more detail further below.

Money transactions between different money accounts that are bound to a common identification module. This allows for example a value or debit account to be loaded from another money account, for example automatically if certain criteria are met.

Determining statistics and reports about the use of the different money accounts. This allows among others payment service providers to adapt advertising campaigns and offers better to the users' needs.

Simultaneous blocking respectively unblocking of all money accounts (bound to a stolen or lost identification module) by the operator or the user.

Bonus point collection programs over several money accounts of several payment service providers.

Direct transactions between money accounts of one or several users without transaction data being sent to external payment service providers. This allows for example a user's prepaid account for using the mobile radio network to be loaded with another money account of another user.

Use of user parameters (name, address, solvency etc.) that have been entered for a certain payment service for another subsequently subscribed payment service of another payment service provider.

In a preferred embodiment, payment transaction data respectively payment authorization data are rendered anonymous before they are made available to the payment platform. For this purpose, the user identification that is linked with certain payment data is replaced in an anonymizer with an alias that is insufficiently indicative for the network operator. In this manner, anonymous payment data are collected, used and statistically evaluated without violating data protection laws.

We will now describe in more detail the inventive method for detecting transaction frauds and transaction fraud attempts. According to the invention, not only parameters of the mobile radio network 3 but also parameters of the payment service provider or providers 4 are used for detecting frauds. In the represented example, frauds are detected with a fraud detection module 33 (for example a server with suitable software applications) in the infrastructure of the mobile radio network 3. This module 33 receives parameters of the mobile radio network (i.e. parameters that are determined within the network) directly from the payment platform 31 and/or from other hardware and software components of the network infrastructure. Parameters of the payment service providers are preferably retrieved over the corresponding data link from the servers 4 of the payment service providers. Alternatively, at least certain payment service provider parameters can be determined from the payment transaction data or payment authorization data transmitted over the payment platform 31; in this case, for reasons of data protection at least certain transaction data can be rendered anonymous.

Since the payment platform 31 and the fraud detection module 33 are centralized in this embodiment, parameters from different payment providers 4 can be combined in order to determine dubious behaviors with an even greater reliability. For example, payment transaction data with a credit card service provider and with a debit card provider can be assessed together in order to determine whether the user behavior is suspect. If a fraud or fraud attempt with one payment service provider is discovered, all money accounts that are bound to the card in question are simultaneously blocked.

The fraud detection module combines as many parameters as possible and attributes to each parameter or to each parameter combination a score that is higher for clear fraud clues than for less clear ones. At least one score is based on the combination of at least one parameter of the mobile radio network with at least one parameter of the payment service provider.

Certain parameters or parameter combinations that indicate an absence of fraud have a negative score. At the end, the module adds up all scores and marks the transaction attempts (or the users or the providers) as suspect if the sum exceeds a predefined threshold. Thanks to the large number of different parameters and the new combinations of parameters of the network and of the different payment service providers, the fraud detection module achieves a very high rate of success.

In a variant embodiment, a finance service provider sends a single multivalued parameter (that indicates for example the probability of a fraud) to the fraud detection module. Similarly, the mobile radio network send another multivalued parameter to the fraud detection module. Both parameters are combined to determine the possibility of a fraud. A transaction that is deemed suspect with a probability greater than a threshold X will for example be authorized only if the probability of a fraud as determined in the mobile radio network is lower than a second threshold Y.

This variant embodiment has the advantage that certain internal parameters of the finance provide and/or of the mobile radio network remain confidential. As a disadvantage, however, no fine combinations or internal parameters of the mobile radio network with internal parameters of the finance service provider can be used as fraud clues.

In another variant embodiment, at least certain combinations of parameters are computed anonymously (for example outside the fraud detection module). In this case, a software application could attribute a "score" to anonymous parameter combinations. The fraud detection module could for example send the following query to this application: "how high is the risk of a payment transaction in this area with this account"; the software application can answer this query without knowing the identity of the payment partner in question.

The parameters that are used for detecting frauds can be collected and combined before each payment transaction. In this case, the fraud detection module 33 can accept or, on the contrary, refuse the transaction or even block the card 10 of the user 1 or disable and put on a black list the provider 2. The recommendation to accept or block a transaction can be sent to the payment service provider concerned.

Additionally to evaluating the fraud detection parameters that are compiled before each payment transaction, parameters for several transactions of a mobile user or of a provider can be processed statistically to detect suspect and/or unusual payment behaviors and possibly block the mobile user 1 or provider 2 in question before they perform new transactions. For this purpose, data mining tools can for example be used.

In a variant embodiment, not represented, the fraud detection module could also be outside the infrastructure of the mobile radio network 3, for example with a payment service provider 4. In this case, network-specific parameters are transmitted to this external fraud detection module. This variant embodiment however has the disadvantage that a fraud detection module must be provided for each payment service provider and that parameters of different payment service providers can hardly be evaluated together.

In another variant embodiment, not represented, some components of the fraud detection module are located inside the network infrastructure 3 and other components outside this infrastructure, for example with the payment service providers 4. Each component can then evaluate other parameters and attribute a score; the scores determined in each component are combined to determine the probability of a fraud. This variant embodiment has the advantage that neither specific mobile radio network parameters nor payment service provider parameters have to be exchanged. A payment service provider does not have to communicate the transaction amount to the network infrastructure but merely a score indicating whether it considers this amount—or other parameters or parameter combinations—to be suspect.

The parameters of the mobile radio network operators that determined within the network infrastructure and that can be used alone or in combination for detecting possible frauds include for example:

The user's location that can be determined by the location-determining module 300.

The identity of the mobile radio network into which the mobile user is currently logged.

The provider's location.

The trajectory of the mobile user before or during the transaction.

The trajectory of the provider before or during the transaction.

The used combination of mobile device and identification module. A payment transaction with a SIM card that is used for the first time with a certain mobile device is more suspect than a transaction with a known pair.

Transmission channel used for the payment transaction (for example SMS, USSD, Bluetooth, etc.) Sudden user behavior changes are suspect.

Mobile device use profile of the mobile user.

Mobile device use profile of the provider.

Manual rather than automatic (respectively unusual) choice of the payment service.

Loading process for loading a prepaid account.

Time, data and day of the week that are determined in the infrastructure of the mobile radio network.

A score or a fraud probability that is computed on the basis of these parameters.

These parameters can also be combined.

The parameters of the payment service providers that are determined by the payment service providers 4 and that are used alone or in combination for detecting possible frauds include for example:

The used payment service. A new customer is for example more suspect than an old customer.

The used money account.

The balance on the used money account.

The payment service use profile.

The payment amount.

The payment transaction frequency.

The provider.

Several failed attempts to authenticate.

Time, date and/or day of the week that are determined by the payment service providers.

Log file of earlier transactions.

Profile data of the mobile user with the payment service provider.

Black list of providers and/or mobile users that are blocked for transaction with a certain money account.

White list of providers and/or mobile users that are authorized for a transaction with a certain money account. White lists can be prepared by third parties and for example downloaded over the Internet.

Grey list of suspect users or providers that hare not yet blocked, but for which for example a credit limit is soon or already exceeded.

Black list of providers and/or mobile users that are blocked for a transaction with a certain money account. Black lists can be prepared by third parties and for example downloaded over the Internet.

Number of transactions with each money account during a predetermined period.

Profile of the user, including for example his age, his account type, other sociological data etc.

A score or a fraud probability computed on the basis of these parameters.

These parameters can also be combined.

As previously mentioned, parameters of several payment service providers can be combined to detect other suspect behaviors. Several occurrences of big spending with several payment services to which a card is bound can for example be considered suspect.

According to the invention, the decision that there is a fraud attempt is based not only on parameters of the mobile radio network, on the combinations of different parameters of the mobile radio network, on parameters of one or several payment service providers, on combinations of several parameters of one or several payment service providers, but also on combinations of one or several parameters of the mobile radio network with one or several parameters of one or several payment service providers.

We will now describe some examples of user behavior that can be considered suspect by the fraud detection module and that can be detected on the basis of combinations of multivalued parameters of the network and of the payment service provider:

Different locations of the user and of the provider for a transaction for which a proximity is expected (for example for payment at a till).

Different trajectories of the user and of the provider for a transaction in a vehicle (for example in a taxi, in public transportation etc.).

Unusual location of the user and unusual transaction amount.

Unusual transmission channel for the transaction data and unusual transaction amount (for example if a user, who always performed his transactions over SMS suddenly spends a large sum over USSD).

Unusual visited mobile radio network and unusual transaction amount respectively unusual transmission channel for the transaction data.

Unusual combination of the SIM card with the mobile device together with an unusual transaction amount.

Unusual transaction of person-to-person at an unusual location or at an unusual time.

Loading of a money account with an unusual loading process or with an unusual amount.

Several authentication attempts with the payment service provider, combined with an unusual transmission channel with the network operator.

Etc. All possible combinations of the above mentioned network and payment service provider parameters can basically be used.

The fraud detection module can also be designed in such a way that it can take into account external parameters that are made available by external third parties connected over the Internet and combines them with other parameters. These parameters can for example include lists of bad payers or suspect providers, or security-critical processes.

These parameters and combinations of parameters are given only by way of example; the one skilled in the art will understand that all network parameters or groups of network parameters can be combined with all payment service provider parameters (or groups of payment service providers) to determine suspect behavior.

The fraud detection module determines on the basis of the different parameters the probability of a fraud or fraud attempt. If this probability is greater than a predetermined threshold, the module sends a message to the payment platform 31, to the payment service provider 4, to the provider 2 and/or to the user 1 in order to block the transaction. The fraud probabilities in several successive transactions of a certain user can also be summed up in order to detect suspect users more efficiently.

The inventive method respectively system can be used among others to perform money transactions from user to user (P-to-P).

The invention claimed is:

1. Method for detecting possible frauds in payment transactions between at least two partners, said method comprising the steps of:

transmitting the payment transaction data and/or payment authorization data over at least one mobile radio network, using at least one multivalued parameter provided by the mobile radio network for detecting a possible fraud attempt being determined in said mobile radio network, wherein said multivalued parameter is a parameter that has a value taken from more than two values, performing said payment transactions over at least one payment service provider, sending to said mobile radio network at least a second multivalued parameter for detecting a possible fraud attempt, said second multivalue parameter being determined by said payment service provider, searching certain combinations of said first and second parameters in order to detect fraud attempts, performing tests for detecting possible frauds before each payment transaction, and performing said tests at least partially in the infrastructure of said mobile radio network, wherein said at least one multivalued parameter includes at least one of the following parameters:

location of the first partner, identity of the mobile radio network, location of the second partner, trajectory of the first partner, trajectory of the second partner, used combination of mobile device and identification module, transmission channel that is used for the payment transaction, mobile device use profile of the first partner, mobile device use profile of the second partner, manual and/or unusual choice of the used payment service, and temporal information including time and/or date, and/or day of the week, and further wherein said second multivalued parameter includes at least one of the following parameters:

used payment service, used money account, balance on the used money account, payment service use profile, payment amount, payment transaction frequency, providing partners, several failed attempts at authentication, temporal information including time, and/or date, and/or day of the week, log file of earlier transactions, black list of partners that are blocked for transaction with a certain money account, white list of partners that are authorized for a transaction with a certain money account, grey list of suspect partners, number of transactions with each money account during a predetermined period, and profile of the partner, wherein
said partners are bound to several money accounts of several payment service providers and wherein parameters from several payment service providers are used to detect possible frauds, and wherein
said partners are each bound to several money accounts and further comprising the steps of determining the pair of money accounts that is used for a particular payment transaction automatically by said payment platform.

2. The method of claim 1, wherein all payment services to which a partner is bound are blocked as soon as a fraud or fraud attempt of the partner has been detected.

3. Fraud detection system to detect possible frauds in payment transactions between two partners, payment data for the payment transaction being transmitted over a mobile radio network, the payment transaction occurring over a payment service provider external to the mobile radio network, said system comprising a fraud detection module for combining mobile radio network internal multivalued parameters with multivalued parameters of the payment service provider sent to the fraud detection system to detect possible frauds, wherein said multivalued parameters are not restricted to having only one of two values, wherein
said mobile radio network performs tests for detecting possible frauds before each payment transaction utilizing said internal multivalued parameters and said multivalued parameters sent by the payment service provider, and wherein
said mobile radio network internal multivalued parameters include at least one of the following parameters:
location of the first partner,
identity of the mobile radio network,
location of the second partner,
trajectory of the first partner,
trajectory of the second partner,
used combination of mobile device and identification module,
transmission channel that is used for the payment transaction,
mobile device use profile of the first partner,
mobile device use profile of the second partner,
manual and/or unusual choice of the used payment service, and
temporal information including time and/or date, and/or day of the week, and further wherein
said payment service provider multivalued parameters include at least one of the following parameters:
used payment service,
used money account,
balance on the used money account,
payment service use profile,
payment amount,
payment transaction frequency,
providing partners,
several failed attempts at authentication,
temporal information including time, and/or date, and/or day of the week,
log file of earlier transactions,
black list of partners that are blocked for transaction with a certain money account,
white list of partners that are authorized for a transaction with a certain money account,
grey list of suspect partners,
number of transactions with each money account during a predetermined period, and
profile of the partner, wherein
both transaction partners are each bound to several money accounts and wherein the pair of money accounts that is used for a certain payment transaction is determined automatically by said payment platform.

4. Fraud detection system according to claim 3, with a payment platform in the infrastructure of the mobile radio network, with which payment transactions can be performed.

5. Fraud detection system according to claim 3, that also takes into account parameters from third parties connected over the Internet.

6. Fraud detection system according to claim 3, comprising the step of using data mining methods to detect unusual behaviors of mobile users.

7. Fraud detection system according to claim 3 that is in a mobile device of one of said partners.

8. Fraud detection system according to claim 3, that is in the terminal of the providing partner.

9. A method for detecting a possible fraud in a payment transaction conducted over a mobile radio network that supports a plurality of payment service providers, said method comprising the steps of:
the mobile radio network receiving a request to make a payment from a user utilizing one of said payment service providers;
the mobile radio network sending information about said request to said one of said payment service providers;
the mobile radio network receiving at least one payment parameter sent from said one of said payment service providers, said at least one payment parameter being generated by said one of said payment service providers based on said information about said request provided to said one of said payment service providers, said payment parameter adapted for use in determining a probability of fraud;
the mobile radio network generating at least one network parameter in response to said request, said network parameter also for use in determining a probability of fraud;
preparing a score based on a combination of said at least one payment parameter and said at least one network parameter such that said score indicates a probability of fraud, wherein
said request is denied by the mobile radio network when said score shows a high probability for fraud but said request is permitted by the mobile radio network when said score indicates a low probability for fraud, wherein
said score indicates a probability of fraud of said request such that said score is adapted to indicate a high probability for fraud for situations where neither of said parameters, alone, would indicate a high probability for fraud, and wherein
said score is also adapted to indicate a low potential for fraud for situations where at least one of said parameters, alone, would indicate a high probability for fraud.

10. The method of claim 9, wherein said score is also based on at least one parameter provided by another one of said plurality of payment service providers generated based on said request or another request of the user.

11. A method for detecting a possible fraud in a payment transaction conducted over a mobile radio network that supports a plurality of payment service providers, said method comprising the steps of:
the mobile radio network receiving a request to make a payment from a user utilizing one of said payment service providers;

the mobile radio network sending information about said request to said one of said payment service providers;

the mobile radio network receiving a plurality of payment parameters sent from said one of said payment service providers, said payment parameters being generated by said one of said payment service providers based on said information about said request provided to said one of said payment service providers, said payment parameters for use in determining probabilities of fraud;

the mobile radio network generating a plurality of network parameters in response to said request, said network parameters also for use in determining a probability of fraud;

preparing at least two scores, each of said scores being based on different combinations of said payment parameters and said network parameters, such that each of said scores indicates a different probability of fraud; and combining said scores to determine an overall probability of fraud, wherein said request is denied by the mobile radio network when said score shows a high probability for fraud, wherein said request is permitted when one or more of said scores indicate a high probability of fraud, but the combination of scores does not indicate a high probability of fraud.

12. A method for detecting a possible fraud in a payment transaction conducted over a mobile radio network that supports a plurality of payment service providers, said method comprising the steps of:

the mobile radio network receiving a request to make a payment from a user utilizing one of said payment service providers;

the mobile radio network sending information about said request to said one of said payment service providers;

the mobile radio network receiving a plurality of payment parameters sent from said one of said payment service providers, said payment parameters being generated by said one of said payment service providers based on said information about said request provided to said one of said payment service providers, said payment parameters for use in determining probabilities of fraud;

the mobile radio network generating a plurality of network parameters in response to said request, said network parameters also for use in determining a probability of fraud;

preparing at least two scores, each of said scores being based on different combinations of said payment parameters and said network parameters, such that each of said scores indicates a different probability of fraud;

combining said scores to determine an overall probability of fraud; and preparing an additional score using at least one parameter based on current or previous payment transactions of the user with another one of said plurality of payment service providers, wherein said combining utilizes said additional score, and wherein said request is denied by the mobile radio network when said score shows a high probability for fraud.

\* \* \* \* \*